US011731495B2

(12) United States Patent
Sawahata et al.

(10) Patent No.: US 11,731,495 B2
(45) Date of Patent: Aug. 22, 2023

(54) DRIP MECHANISM OF SUNROOF DEVICE

(71) Applicant: Webasto SE, Stockdorf (DE)

(72) Inventors: Koji Sawahata, Hiroshima (JP); Toru Shibue, Hiroshima (JP)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/639,068

(22) PCT Filed: Oct. 22, 2020

(86) PCT No.: PCT/EP2020/079724
§ 371 (c)(1),
(2) Date: Feb. 28, 2022

(87) PCT Pub. No.: WO2021/078844
PCT Pub. Date: Apr. 29, 2021

(65) Prior Publication Data
US 2022/0379694 A1 Dec. 1, 2022

(30) Foreign Application Priority Data
Oct. 24, 2019 (JP) ................................. 2019-193794

(51) Int. Cl.
B60J 7/00 (2006.01)
B60J 7/053 (2006.01)

(52) U.S. Cl.
CPC ............. B60J 7/0084 (2013.01); B60J 7/053 (2013.01)

(58) Field of Classification Search
CPC . B60J 7/0084; B60J 7/024; B60J 7/028; B60J 7/05; B60J 7/053
USPC ................. 296/213, 221, 222, 223
See application file for complete search history.

(56) References Cited

U.S. PATENT DOCUMENTS

2009/0243344 A1  10/2009  Clephas et al.

FOREIGN PATENT DOCUMENTS

| DE | 10203848 A1 | 8/2003 | |
|---|---|---|---|
| DE | 102005001869 A1 * | 7/2006 | ............ B60J 7/0084 |
| EP | 0317730 B1 * | 11/1990 | .......... B60J 7/00084 |
| GB | 2167356 A | 5/1986 | |
| JP | 2002274181 A | 9/2002 | |

(Continued)

OTHER PUBLICATIONS

International Search Report for PCT/EP2020/079724 dated Jan. 28, 2021 (5 pages).

Primary Examiner — Dennis H Redder
(74) Attorney, Agent, or Firm — Fitch, Even, Tabin & Flannery, LLP

(57) ABSTRACT

To allow receiving rain water by moving a drip member upward and downward in a substantially horizontal direction with a tilting motion of a roof panel, a drip mechanism has a drip member including a trough in an upper surface and covering the entire length of a lower side of a rear edge of a roof panel; left and right movable bodies disposed on guiderails in left and right side portions of a frame; a lifting unit connecting the drip member to the left and right movable bodies that allows the drip member to move upward and downward; and an interlocking member connecting the drip member with the roof panel. In the lifting unit, front and rear link members connect the drip member with the movable body and a member urging, in a rising direction, portions of these front and rear link members and on the drip member-connected side.

4 Claims, 15 Drawing Sheets

(56) References Cited

FOREIGN PATENT DOCUMENTS

KR         100968832 B1 *   7/2010   ............ B60J 7/0084
WO      2014045338 A1     3/2014

* cited by examiner

DRIP MECHANISM OF SUNROOF DEVICE

CROSS-REFERENCE TO RELATED APPLICATION

This application is a U.S. national phase application filed under 35 U.S.C. § 371 of International Application No. PCT/EP2020/079724, filed Oct. 22, 2020, designating the United States, which claims priority from Japan Patent Application Number 2019-493794, filed on Oct. 24, 2019, which is hereby incorporated herein by reference in its entirety for all purposes.

TECHNICAL FIELD

The present invention relates to a drip mechanism mounted in a sunroof device of a vehicle.

BACKGROUND ART

A drip mechanism of a sunroof device of a vehicle is configured to receive rain water dripping from a rear edge of a roof panel in a tilt-up posture and from a front edge of a closing panel, receive rain water dripping from a rear edge of the roof panel in a tilt-down posture, and receive rain water as moving together with the rear edge of the roof panel until the roof panel moves rearward to become in a fully-opened posture.

Patent Literature 1 (Abstract) describes a technique in which, in a vehicular sunroof device, a lid member which covers and uncovers an opening formed in a roof is guided by guiderails disposed on both sides of the opening and can perform tilt-up, that is, moving a rear edge of the lid member, and has one end rotatably connected to a rear end of a lid bracket supporting the lid member and the other end where drain guides each having a protrusion and slidably sliding on the guiderail is disposed. In the drain guide, a rear drain which receives water drops dropping from the lid member and drains outside the vehicle is supported.

That is, the drip mechanism of Patent Literature 1 is configured to be provided so that the drain guide supporting the rear drain has one end rotatably connected to the rear end of the lid bracket and the other end having a protrusion slidable on the guiderail and the rear drain is tilted as the roof is tilted up and down.

CITATION LIST

Patent Literature

Patent Literature 1: Japanese Unexamined Patent Application Publication No. 2002-274181

SUMMARY OF INVENTION

Technical Problem

In the conventional technique, the drain member is moved upward and downward in conjunction with the tilting motion of the roof panel so as to be able to prevent separation from the rear edge of the roof panel. However, the upward and downward movement of the drain member is a tilted movement with a fore part moving upward and downward as being centered around a rear part. When the roof panel is tilted up, the drain member is in a tilted posture with its head upward, thereby making it difficult to sufficiently achieve an action of receiving rain water.

The present invention is to provide a drip mechanism of a sunroof device capable of solving these problems in the conventional technique.

The present invention is to provide a drip mechanism of a sunroof device capable of sufficiently achieving an action of receiving rain water by moving a drip member upward and downward in a substantially horizontal direction in conjunction with a tilting motion of a roof panel.

Solution to Problem

Specific means for solving the problem in the present invention are as follows.

First, the invention is characterized by a drip mechanism H of a sunroof device disposed in an upper portion of a frame structure F disposed under an opening K formed in a roof R of a vehicle, the drip mechanism H being disposed below a rear edge of a roof panel P for covering and uncovering the opening K, the drip mechanism H being configured to move together with the roof panel P when the roof panel moves, the drip mechanism H comprising:

a drip member 21 including a trough portion 21a in an upper surface thereof and covering the entire length of a lower side of the rear edge of the roof panel P;

a pair of left and right movable bodies 22 disposed on guiderails Fa provided in left and right side portions of the frame structure F, respectively;

a lifting unit 23 connecting the drip member 21 to each of the left and right movable bodies 22 in a manner that allows the drip member 21 to move upward and downward; and an interlocking member 24 connecting the drip member 21 with the roof panel P, wherein in the lifting unit 23, a pair of front and rear link members 25F and 25R connecting the drip member 21 with the movable body 22 and an urging member 26 urging, in a rising direction, portions of the front and rear link members 25F and 25R on the drip member 21-connected side are provided.

Secondly, the invention is characterized in that the front and rear link members 25F and 25R of the lifting unit 23 are parallel to each other and set to have substantially the same link length L.

Thirdly, the invention is characterized in that in the front link member 25F of the lifting unit 23, a front engagement portion 25fb projects rearward-downward from a lower pivotally supporting portion 25fa, in the rear link member 25R of the lifting unit 23, a rear engagement portion 25rb projects forward-upward from a lower pivotally supporting portion 25ra, and a single urging member 26 is connected so as to apply a tensile force to the front engagement portion 25fb of the front link member 25F and the rear engagement portion 25rb of the rear link member 25R.

Fourthly, the invention is characterized in that each of the left and right movable bodies 22 includes a rear pivotally supporting portion 22r pivotally supporting the lower pivotally supporting portion 25ra of the rear link member 25R, and a front pivotally supporting portion 22f disposed at a higher position compared to the rear pivotally supporting portion 22r and pivotally supporting the lower pivotally supporting portion 25fa of the front link member 25F, and the upper side of the movable body 22 is opened upward from the front pivotally supporting portion 22f to the rear pivotally supporting portion 22r so as to form a placement space 22a in which the lower pivotally supporting portions 25fa and 25ra of the front and rear link members 25F and 25R and the urging member 26 connected to both of the lower pivotally supporting portions 25fa and 25ra are disposed.

Advantageous Effects of Invention

According to the present invention, an action of receiving rain water can be sufficiently achieved by moving the drip member upward and downward in a substantially horizontal direction in conjunction with a tilting motion of the roof panel.

That is, in the invention according to claim 1, in the lifting unit 23 connecting the drip member 21 to each of the left and right movable bodies 22 in a manner that allows the drip member 21 to move upward and downward, the pair of front and rear link members 25F and 25R connecting the drip member 21 with the movable body 22 and the urging member 26 urging, in a rising direction, portions of the front and rear link members 25F and 25R on the drip member 21-connected side are provided. Thus, the drip member 21 can move upward and downward with tilting movement of the paired of the front and rea link members 25F and 25R. With the drip member 21 moving upward and downward in a substantially horizontal direction, the action of receiving rain water can be sufficiently achieve.

That is, in the invention according to claim 2, the front and rear link members 25F and 25R of the lifting unit 23 are parallel to each other and set to have substantially the same link length L. Thus, the drip member 21 can move upward and downward as being horizontally oriented as soon as possible, and the action of receiving rain water can be sufficiently achieved.

That is, in the invention according to claim 3, the single urging member 26 is connected so as to apply a tensile force to the front engagement portion 25fb of the front link member 25F and the rear engagement portion 25rb of the rear link member 25R. Thus, the tensile forces applied to the front and rear link member 25F and 25R can be made substantially uniform, and manufacturing cost can be reduced.

That is, in the invention according to claim 4, the placement space 22a opened upward from the front pivotally supporting portion 22f to the rear pivotally supporting portion 22r is formed on the upper surface side of the movable body 22. Thus, the lower pivotally supporting portions 25fa and 25ra of the front and rear link members 25F and 25R and the urging member 26 connected to both of the lower pivotally supporting portions 25fa and 25ra can be disposed, and the dimensions of the lifting unit 23 in the vertical direction can be reduced.

BRIEF DESCRIPTIONS OF THE DRAWINGS

DESCRIPTION OF EMBODIMENTS

Figure 1:
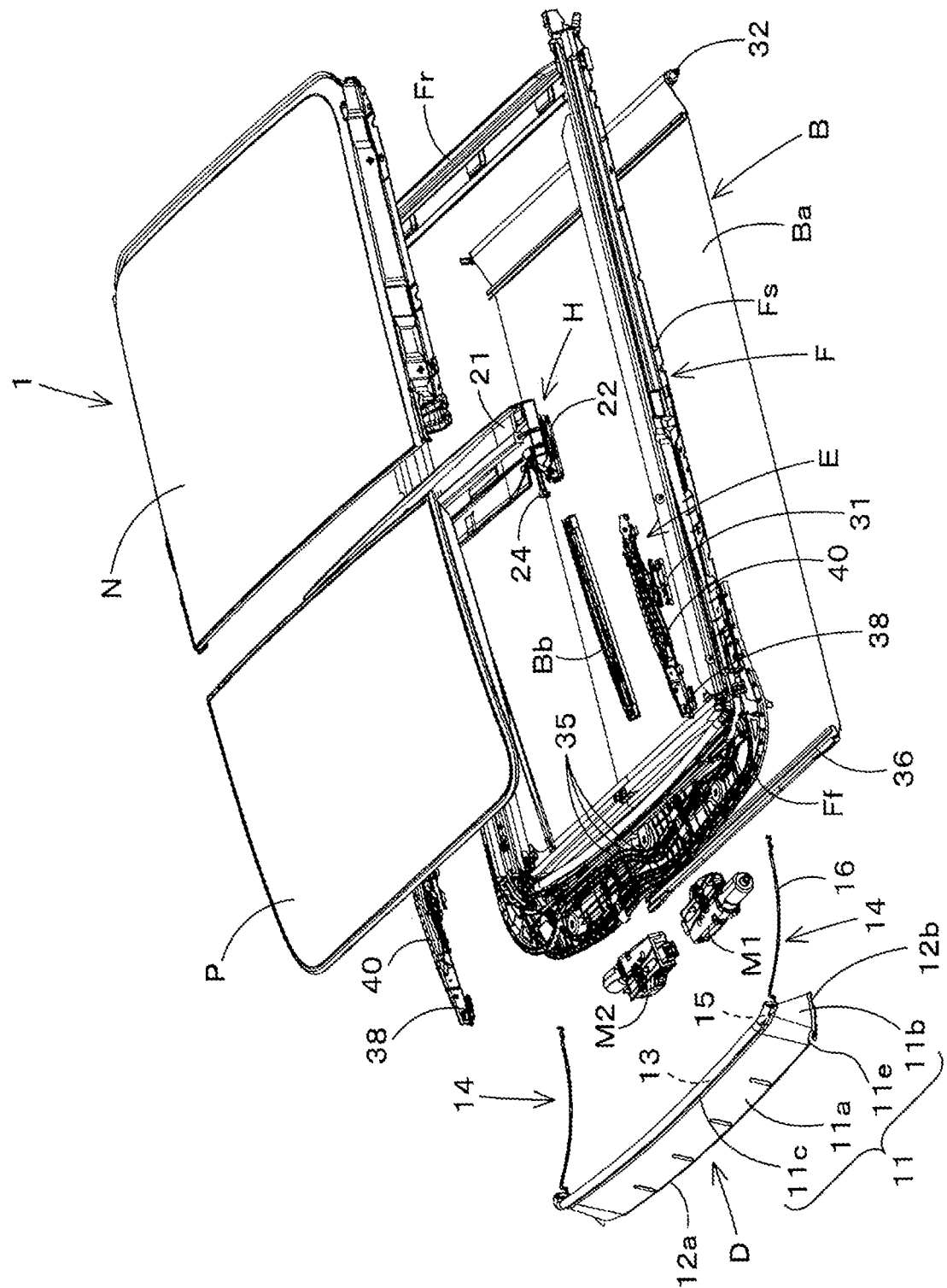
FIG. 1 is a general exploded perspective view of a sunroof device depicting an embodiment of the present invention.

In the following, embodiments of the present invention are described based on the drawings.

In FIG. 1 to FIG. 14, an opening K is formed in a roof R of a passenger automobile vehicle depicted as one example of a vehicle, and a sunroof device 1 is attached from an in-car side to a lower surface of the roof R of the vehicle on the peripheral edge of this opening K. Note that the width direction of the vehicle corresponds to a lateral direction and the forward side corresponds to the front.

In FIG. 1 to FIG. 4, the sunroof device 1 includes a frame structure F disposed under the opening K of the roof R of the vehicle, a transparent closing panel N closing a substantially rear half of the opening K, a roof panel P closing a substantially front half of the opening K and configured to cover and uncover the opening K, a drive mechanism E which causes this roof panel P to perform a tilting motion and a sliding motion, a deflector mechanism D disposed in a fore part of the frame structure F, a drip mechanism H which moves with a rear edge of the roof panel P, and a blind mechanism B capable of causing a blind member Ba to advance from a rear part to the fore part of the frame structure F.

The frame structure F is a rectangular frame forming the next smaller hole than the opening K, and includes a front frame Ff positioned at the lower front of the opening K, left and right side frames Fs extending rearward from left and right side portions of this front frame Ff, and a rear frame Fr connecting rear parts of these left and right side frames Fs together. Note that a beam connecting midway parts of the left and right side frames Fs together may be provided.

Disposed above the front frame Ff are a first motor M1 for driving the roof panel P, a second motor M2 for moving the blind member Ba forward and rearward, and so forth. Formed above the left and right side frames Fs are guiderails Fa where left and right drive engaging members 31 for moving the roof panel P move, drain rails Fb for drainage, blind rails Fc for guiding both left and right ends of a lateral bar 36 at an end of the blind member Ba, and so forth. Above the rear frame Fr, a roll shaft 32 of the blind member Ba of the blind mechanism B is supported.

The first motor M1 is provided with a drive gear 33. With that drive gear 33, two toothed push-pull cables 34 are intermeshed. The two toothed push-pull cables 34 are connected to the left and right drive engaging members 31, respectively. Rotation of the first motor M1 moves the left and right drive engaging members 31 simultaneously forward or rearward. The two toothed push-pull cables 34 are respectively guided by guide pipes 35. These guide pipes 35 extend from the front frame Ff through frame corner portions to the left and right side frames Fs.

Also, similarly, the second motor M2 is provided with a drive gear 33. With that drive gear 33, two toothed push-pull cables 34 are intermeshed. The two toothed push-pull cables 34 are connected to the both left and right ends of the lateral bar 36 at the end of the blind member Ba, respectively. Rotation of the second motor M2 moves the left and right ends of the lateral bar 36 simultaneously forward or rearward. The two toothed push-pull cables 34 are respectively guided by the guide pipes 35. These guide pipes 35 extend from the front frame Ff through the frame corner portions to the left and right side frames Fs.

The two guide pipes 35 on each of the left and the right are disposed, in particular, above the frame corner portions, from the front frame Ff to the left and right side frames Fs, forming a structure disposed above the frame structure F.

The closing panel N is a daylighting glass panel, is fixed to the left and right side frames Fs and so forth of the frame structure F, and has its surface substantially identical to the surface of the roof R of the vehicle and its lower portion serving as an accommodation space of the roof panel P when opened.

The roof panel P is formed from glass capable of daylighting, and has each of left and right lower surfaces to which a lifter configuring the drive mechanism E is attached.

The drive mechanism E is configured of a lifter 40 with a lift guide 39 formed on a side surface, a drive engaging member 31 which causes the lifter 40 engaged with the lift guide 39 formed in this lifter 40 to perform a tilting motion and a sliding motion, the first motor M1 which moves this drive engaging member 31 to move forward and rearward via the push-pull cables 34, and so forth.

Figure 2A:
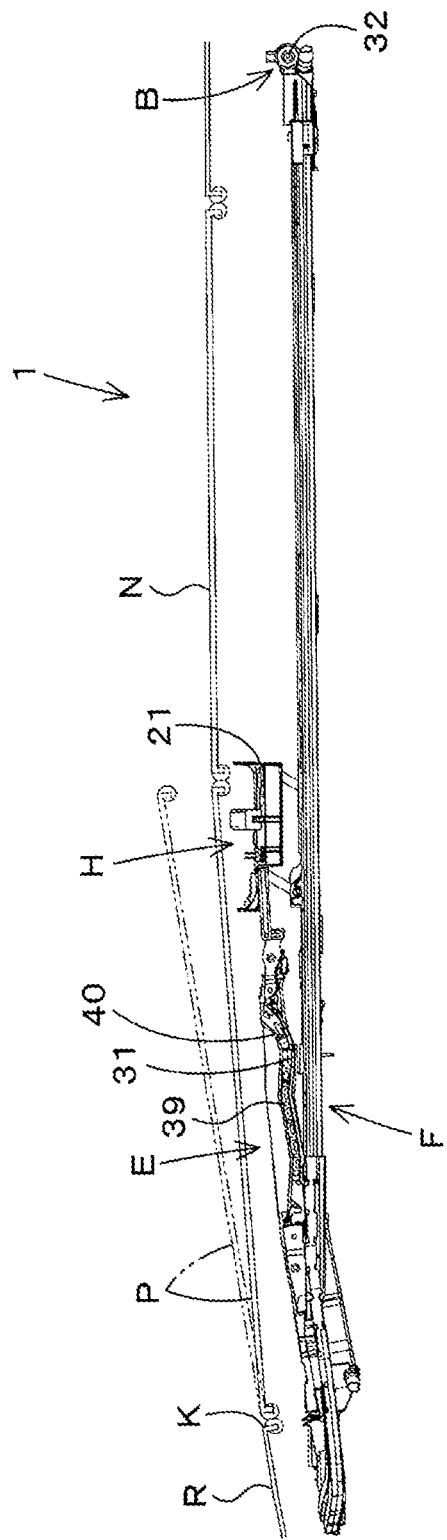
FIG. 2A depicts a cross section acquired by cutting the sunroof device along its center line and is a cross-sectional side view in a posture with a roof panel closed.

With a fore shoe 38 provided to a fore part of the lifter 40 and the drive engaging member 31 guided by the guiderail Fa, the roof panel P is movable forward and rearward integrally with the lifter 40. The lift guide 39 is a cam groove and, with the drive engaging member 31 moving in that groove, the roof panel P performs a tilting motion integrally with the lifter 40 (FIG. 2A).

Figure 2B:
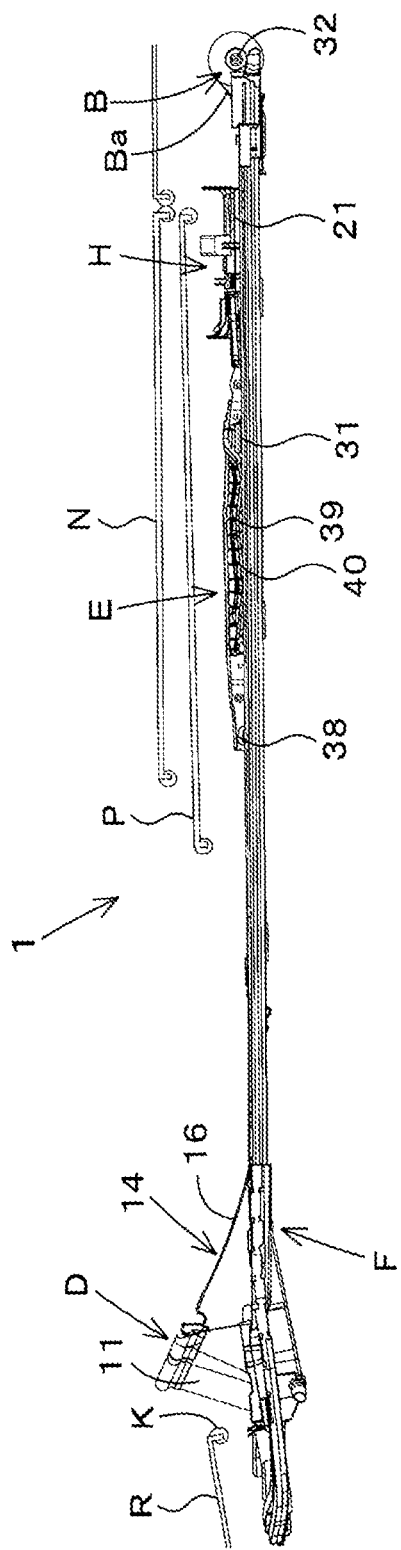
FIG. 2B depicts a cross section acquired by cutting the sunroof device along the center line and is a cross-sectional side view in a posture with the roof panel fully opened.
Figure 3:
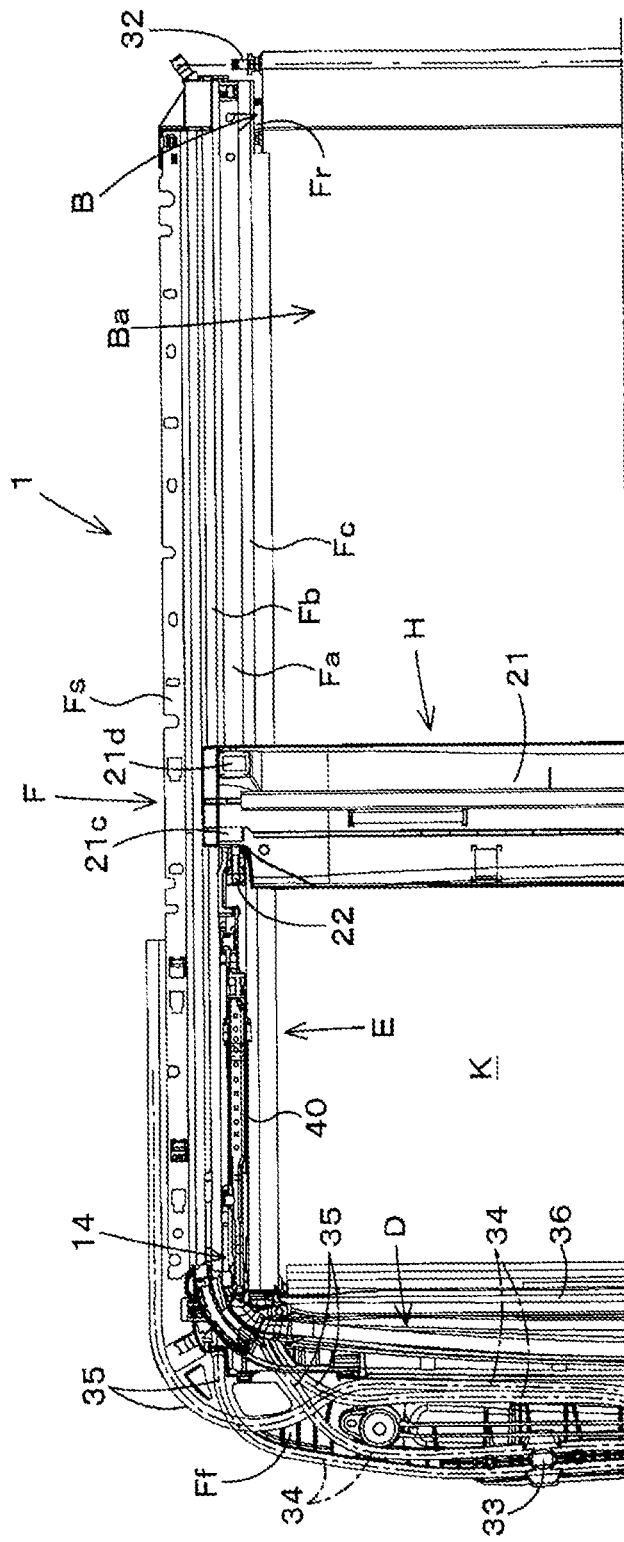
FIG. 3 is a plan view of the sunroof device acquired by cutting the sunroof device along the center line, with the roof panel and a closing panel removed.
Figure 4:
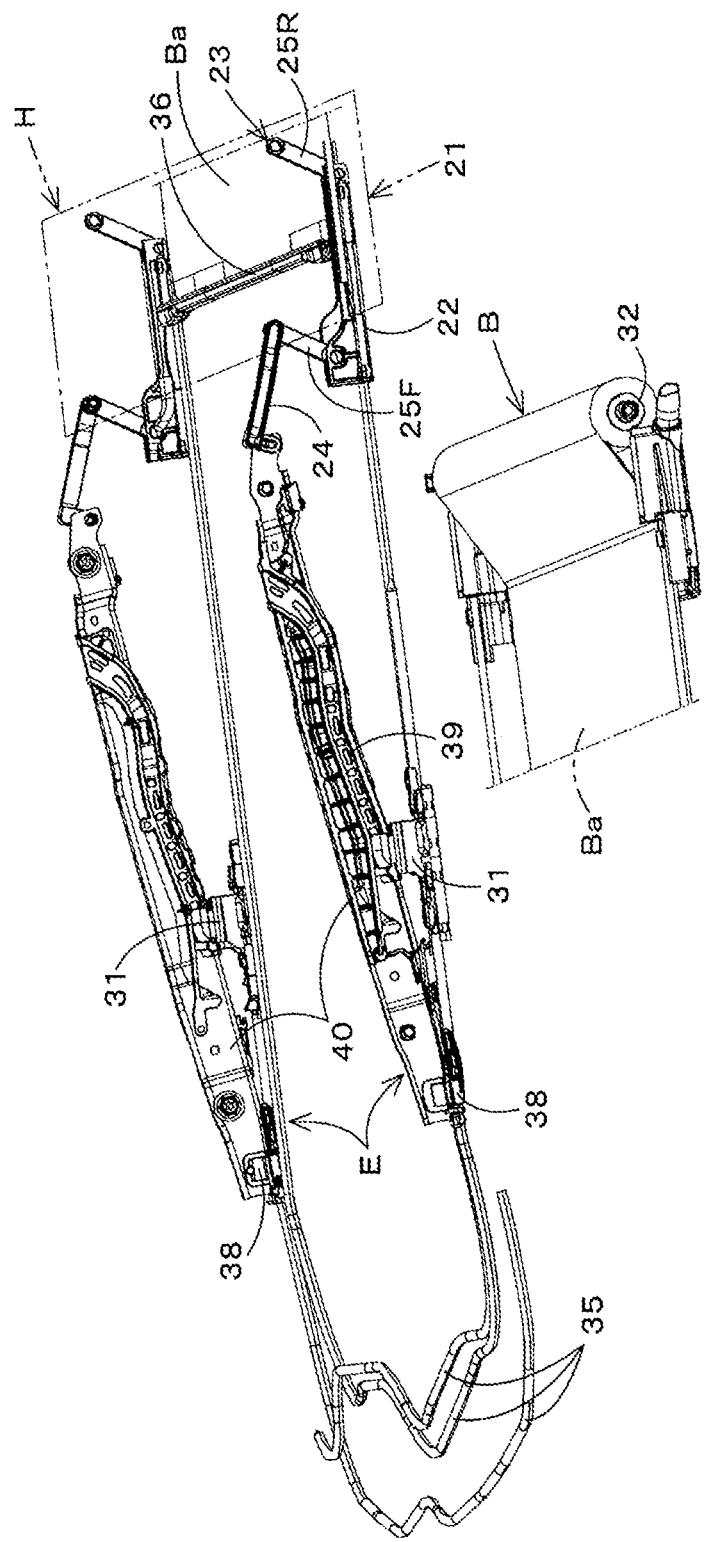
FIG. 4 is a perspective view depicting a drive mechanism, a blind mechanism, a drip mechanism, and so forth of the sunroof device.

With the drive engaging member 31 moving forward in the lift guide 39, the roof panel P in a posture closing the opening K performs a tilt-up motion in which a rear part moves upward as being centered around a fore shoe 38 side. With the drive engaging member 31 moving rearward, the roof panel P in the posture closing the opening performs a tilt-down motion in which the rear part moves downward as being centered around the fore shoe 38 side. When the drive engaging member 31 reaches a rear end of the lift guide 39, in the subsequent reward movement of the drive engaging member 31, the roof panel P in the tilt-down posture is moved rearward to be under the closing panel N, thereby becoming in a posture of fully opening the opening K (FIG. 2B).

In the blind mechanism B, the blind member Ba such as a cloth is rolled up onto the roll shaft 32 above the rear frame Fr. The blind member Ba has a core material such as a cord sewn in each of left and right ends, and has the lateral bar 36 provided at the front end.

The left and right ends of this lateral bar 36 are connected to the push-pull cables 34 driven by the second motor M2. Driving by the second motor M2 causes a fore part of the blind member Ba to move forward and below the opening K. Rolling back the blind member Ba is performed by reverse rotation of the second motor and a return spring provided to the roll shaft 32.

Also, an inner blind member Bb is provided inside the fore part of each of the left and right side frames Fs.

In FIG. 1 to FIG. 3 and FIG. 5 to FIG. 9, when the roof panel P moves rearward from a tilt-down position, the deflector mechanism D moves upward (develops) by the spring force to become in a wind deflecting posture. When the roof panel P moves forward from the rear to move to the tilt-down position, the deflector mechanism D is pushed down by the roof panel P to move downward (collapse) to become in an accommodated posture.

The deflector mechanism D has a collapsible deflector member 11, a lower edge member 12 attached and fixed to a lower edge of this deflector member 11 to be attached to the front frame Ff of the frame structure F, an upper edge member 13 supporting an upper edge of the deflector member 11, and arms 14 supporting both ends of this upper edge member 13 to move upward and downward.

Each of the arms 14 has an arm end 15 connected to one of lateral (longitudinal) ends of the upper edge member 13 (longitudinal direction) and an arm body 16 with a base portion attached to the frame structure F in a manner that allows this arm end 15 to move upward and downward. The arm end 15 is formed from a synthetic resin, and the arm body 16 including an end connected to the arm end 15 is formed from a curved leaf spring.

Also, a front attachment body 17 and an arc-shaped attachment body 18 for attaching the lower edge of the deflector member 11 to the frame structure F are provided.

The deflector member 11 is formed from a breathable net material (or mesh material), and has the front portion 11a positioned on the front side of the opening K and left and right corner portions 11b extending, in a curved manner, rearward from both ends of this front portion 11a. Note that the deflector member 11 may be formed from any collapsible material such as a canvas or a sheet material.

In the deflector member 11, as depicted in FIG. 1, FIG. 2B, FIG. 5, and FIG. 6(A), in a developing posture with the upper edge moved upward, the front portion 11a becomes in a posture tilted rearward from its lower edge to its upper edge, and the corner portion 11b become in a posture as an arc-shaped surface of a cone trapezoid from its lower edge to its upper edge.

In the deflector member 11, a band cloth is rolled to form a slender pipe to be sewn to an upper edge of one sheet of a horizontally-long wide net material. On the upper edge of the deflector member 11 including the front portion 11a and the left and right corner portions 11b, a bag-shaped fitting portion 11c fitted onto the upper edge member 13 is formed. With both left and right ends of this fitting portion 11c partially sewn, a protruded lock portion 11d is formed.

That is, in side portions at both ends of a sewn portion forming a pipe shape at the upper edge of the net material, when lower side portions at both ends are sewn with a hole left in upper side portions, sewing the lower side portions at both ends of the sewn portion at the upper edge of that net material decreases an inlet inner diameter of the fitting portion 11c, and this sewing of the lower side portions forms the lock portion 11d.

Formed at the arm end 15 are an arc-shaped portion 15a inserted into the corner portion 11b of the deflector member 11 and a substantially linear connecting portion 15b positioned on an end side of this arc-shaped portion 15a and connected to an end of the upper edge member 13 formed from the pipe material.

Figure 7:
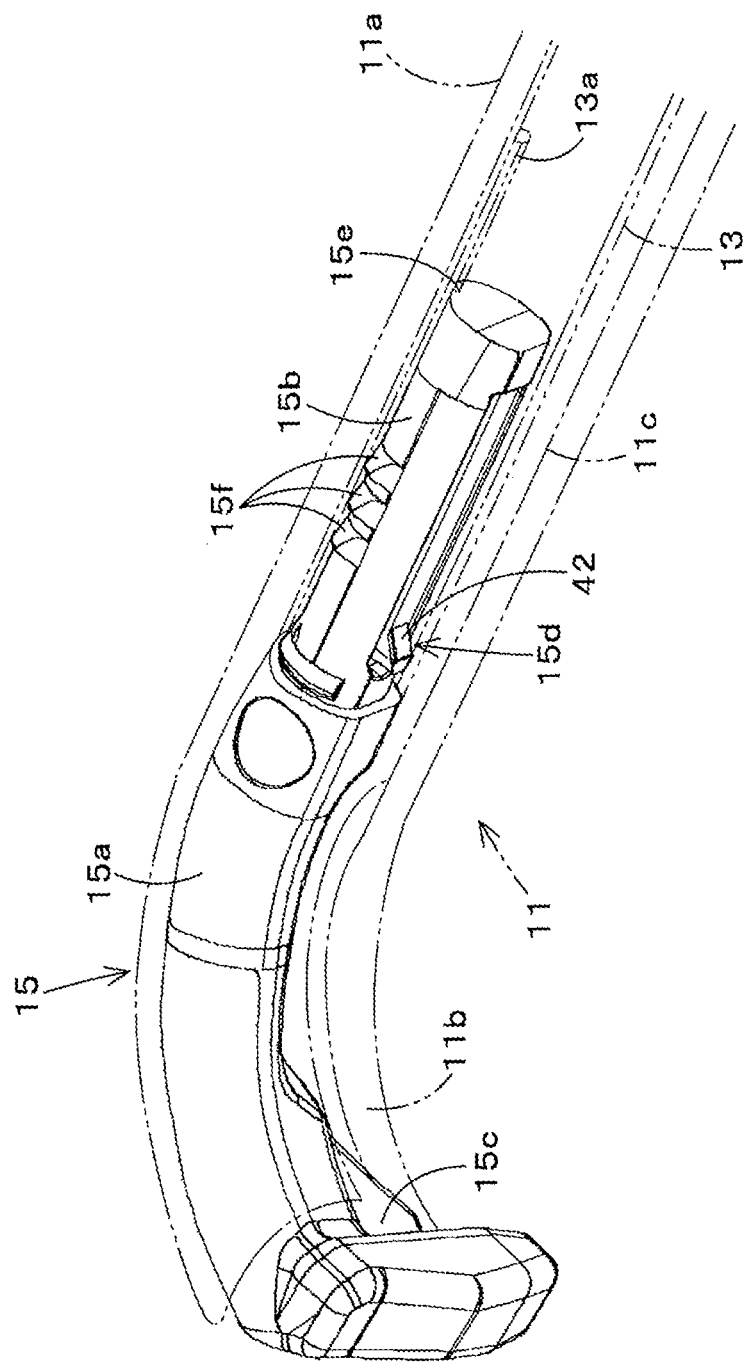
FIG. 7 is a plan view depicting main portions of the deflector mechanism.
Figure 8:
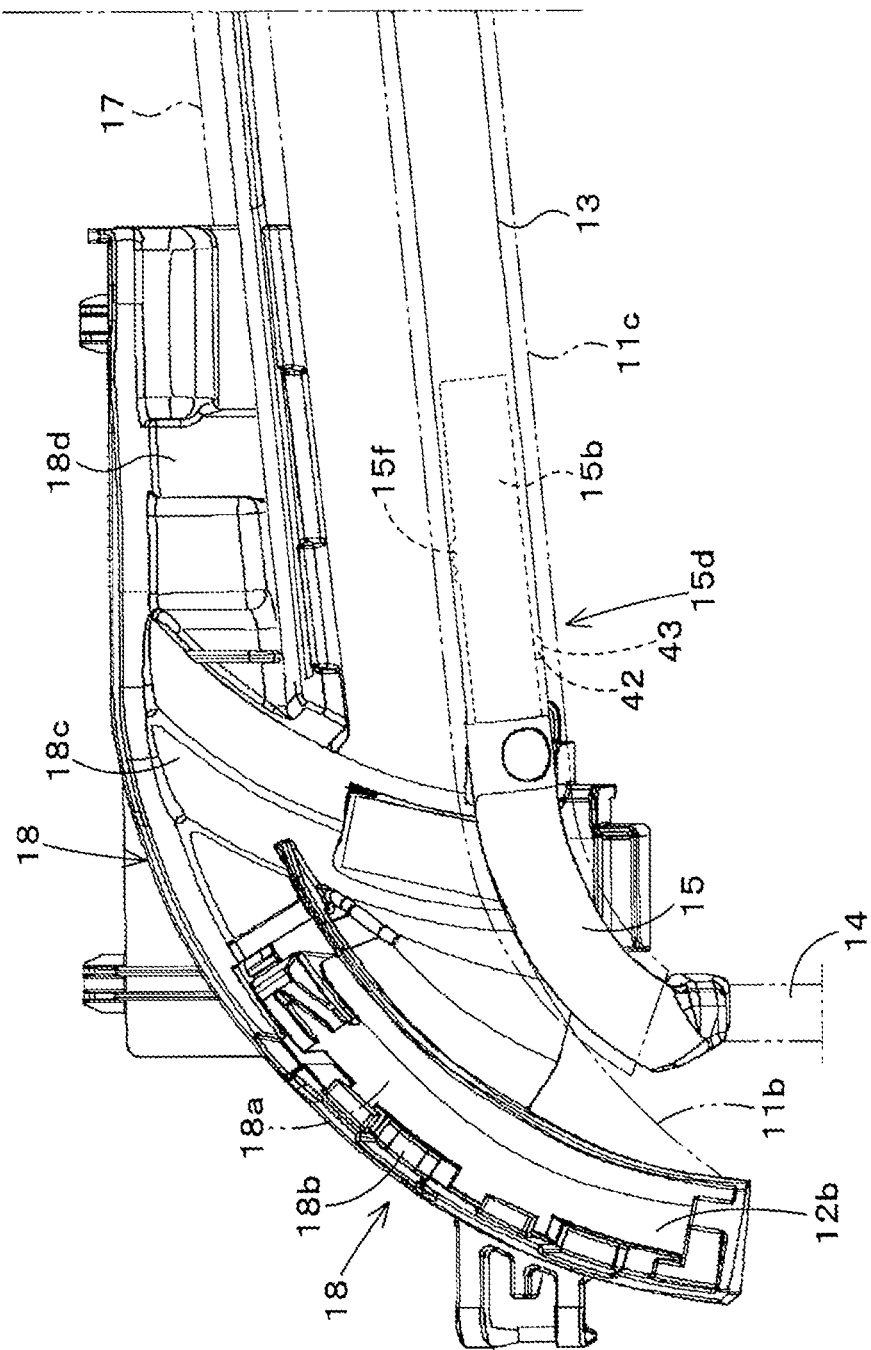
FIG. 8 is a perspective view depicting an arm end.
Figure 9:
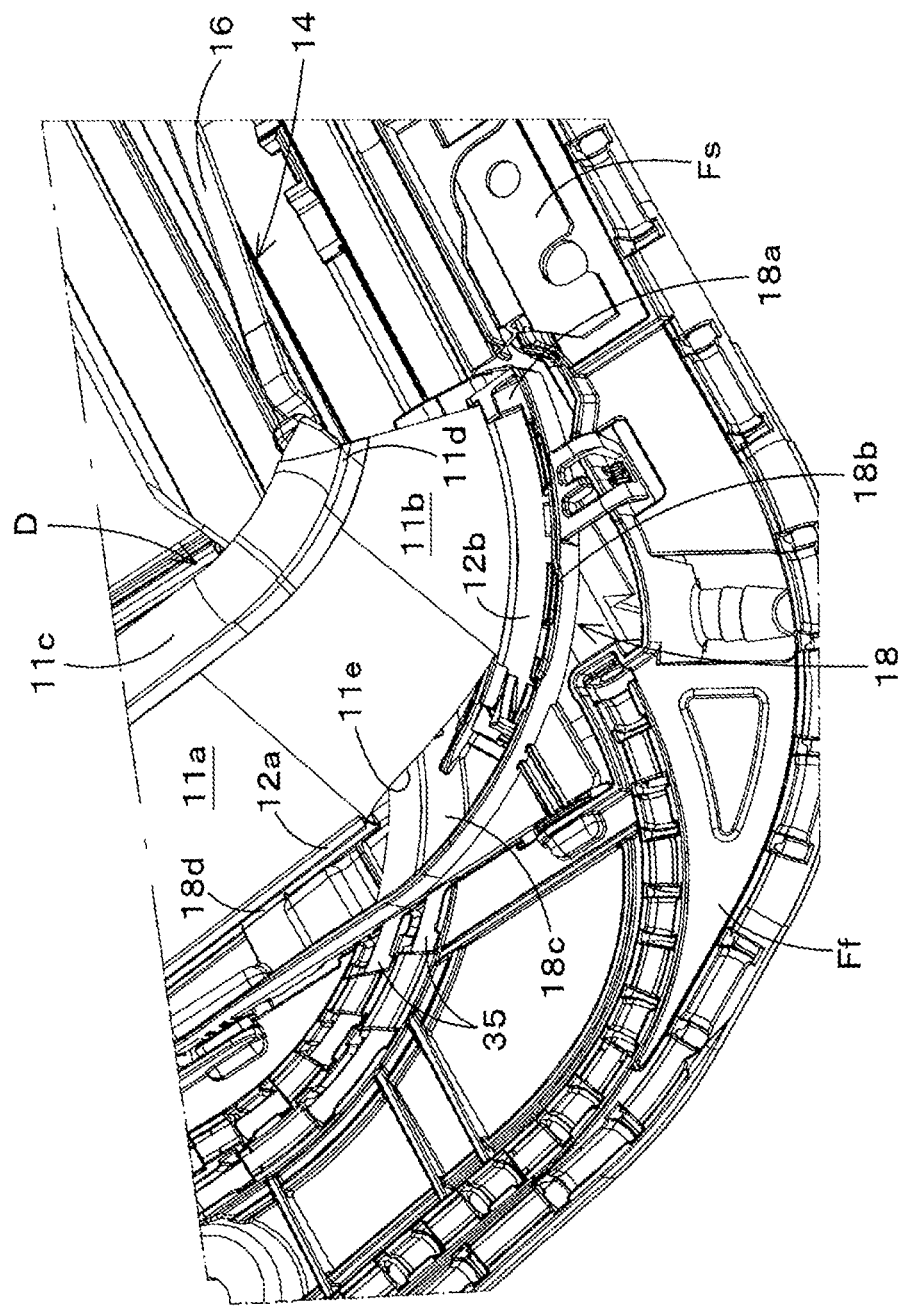
FIG. 9 is a perspective view depicting main portions of the deflector mechanism.
Figure 10:
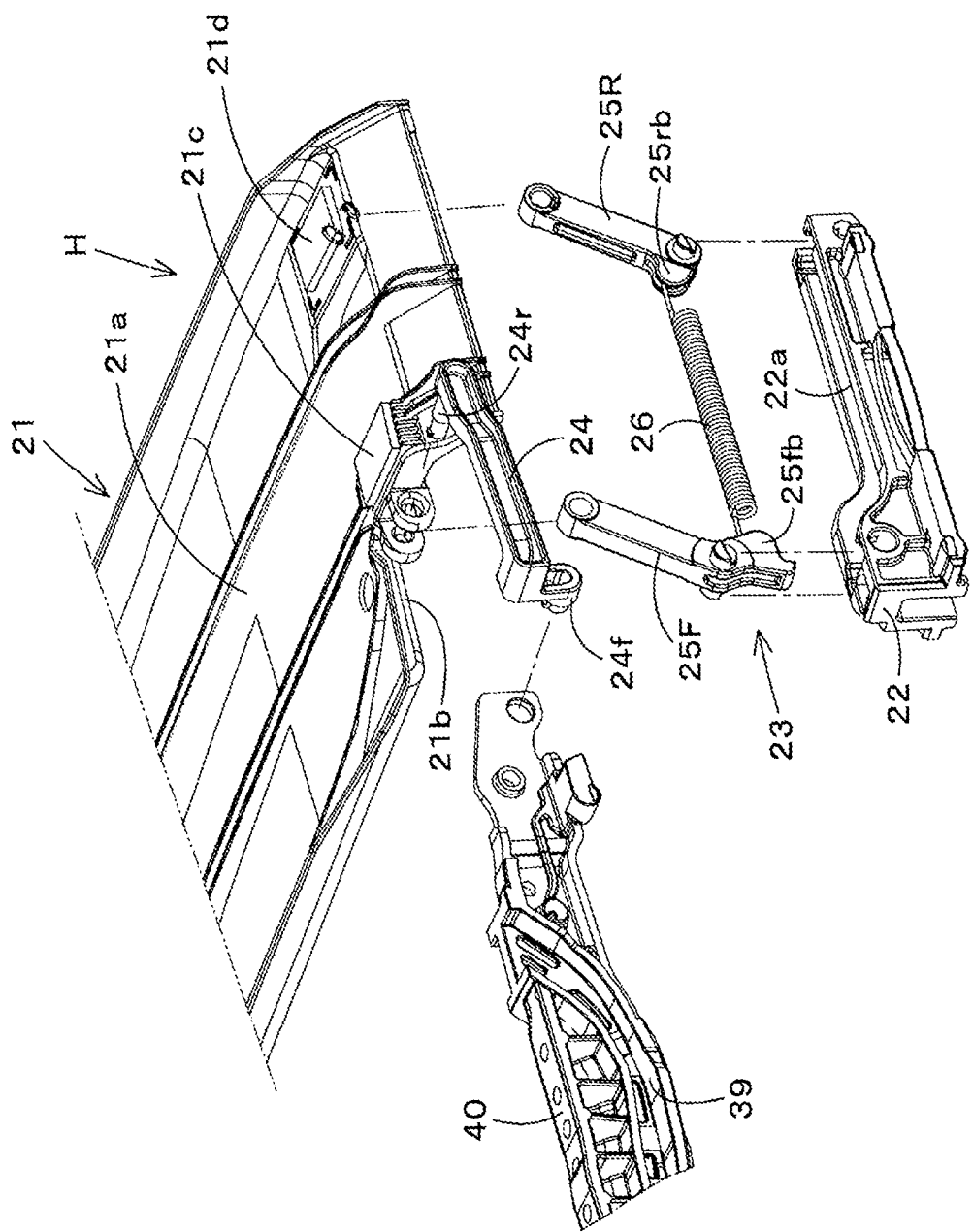
FIG. 10 is an exploded perspective view of a drip mechanism.
Figure 11:
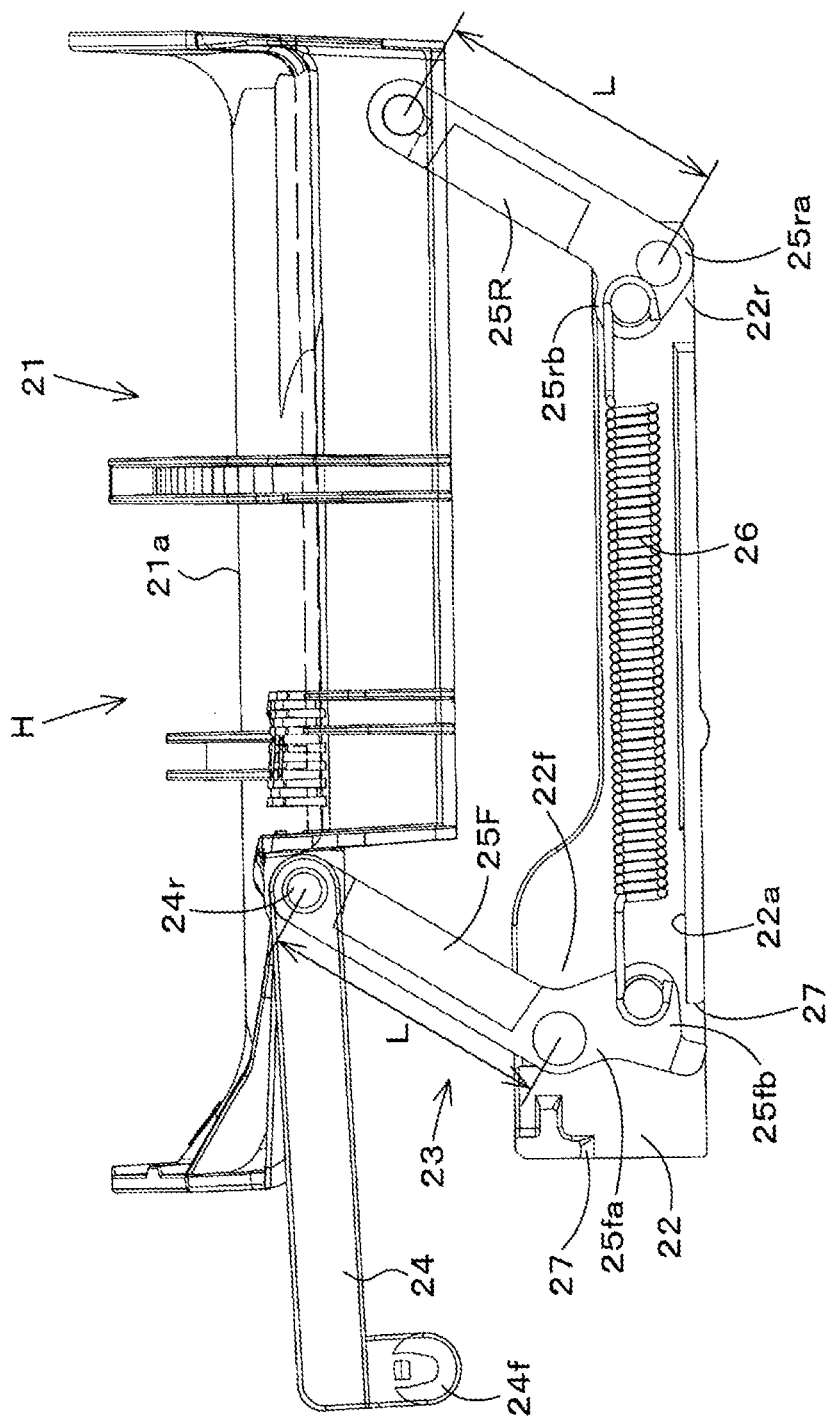
FIG. 11 is a side view of the drip mechanism.
Figure 12:
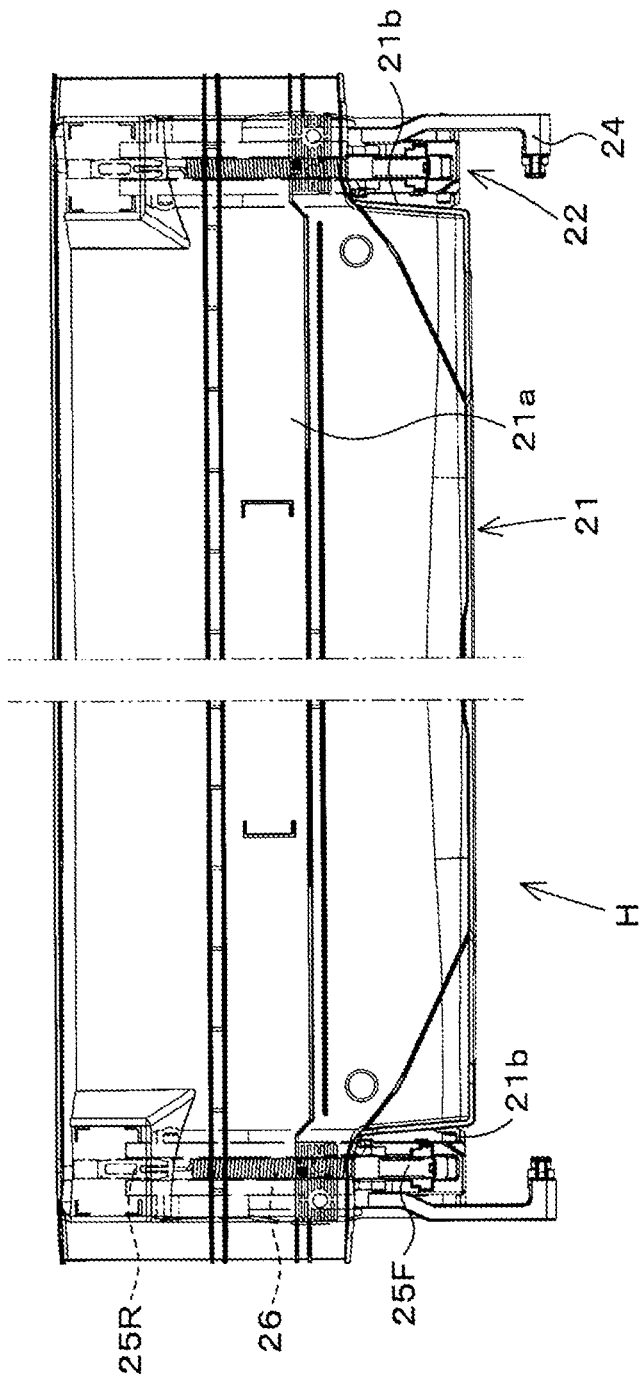
FIG. 12 is a plan view of the drip mechanism.
Figure 13:
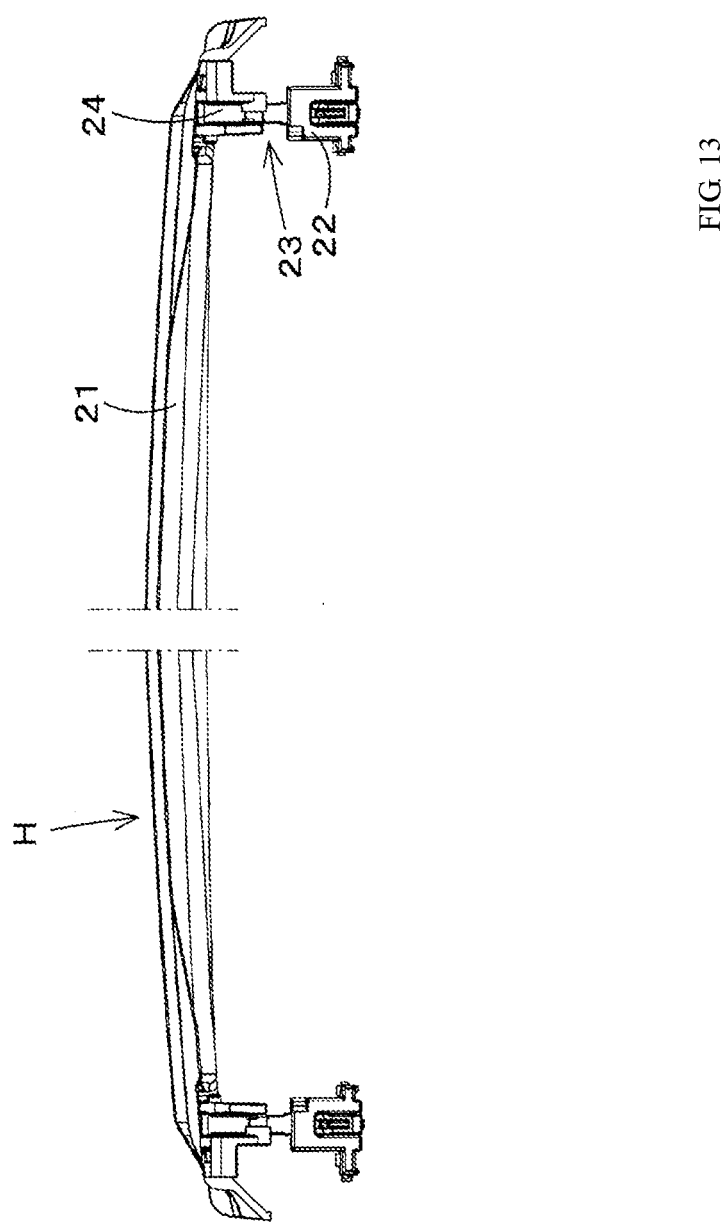
FIG. 13 depicts a front portion of the drip mechanism.
Figure 14:
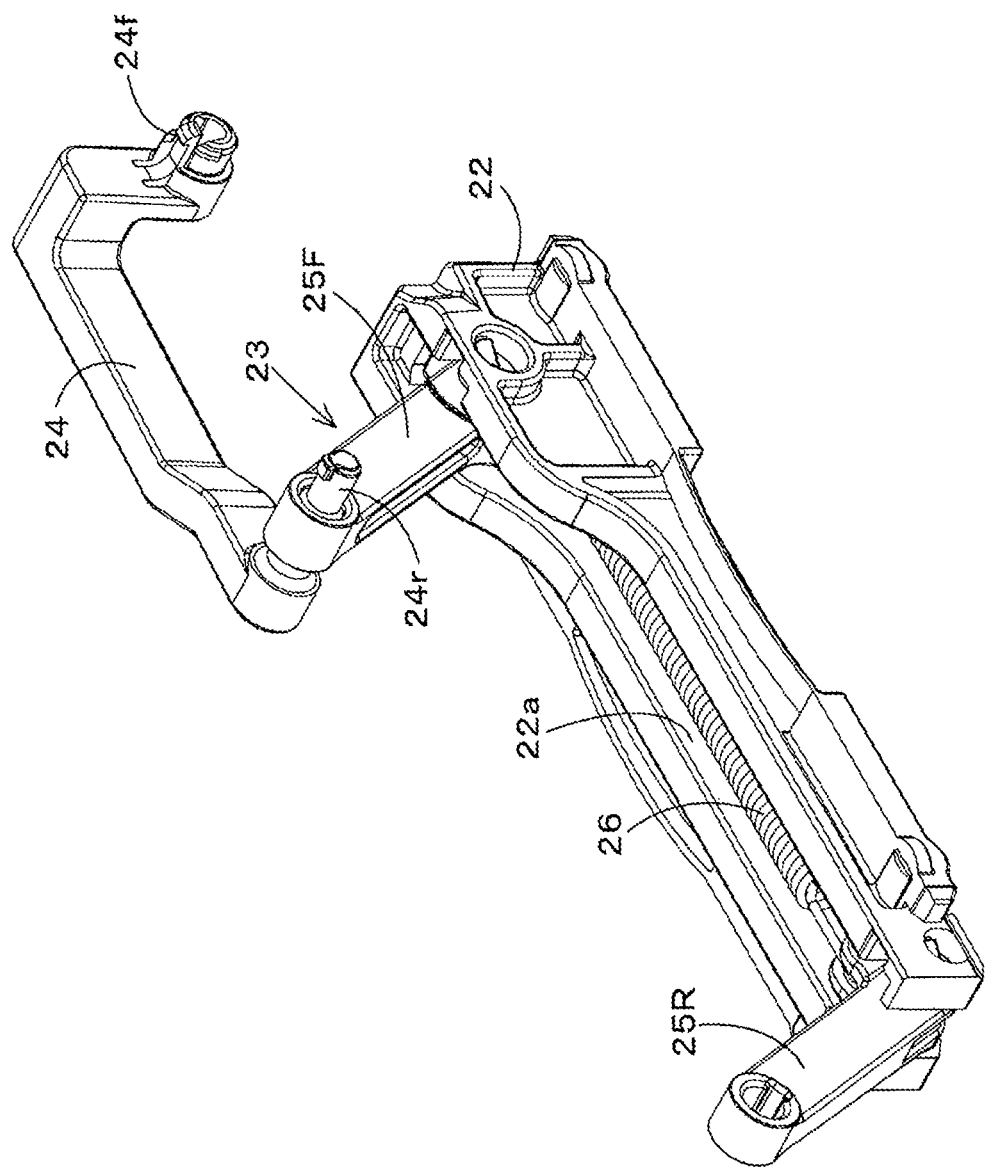
FIG. 14 is a perspective view of the drip mechanism.

As depicted in FIG. 7 and FIG. 8, the arc-shaped portion 15a of the arm end 15 has a curved stick shape, has a diameter substantially equal to that of the upper edge member 13, and has an engaging portion 15c protruding downward and formed at an end connected to the arm body 16. The engaging portion 15c has a surface on an arm body 16 side (surface corresponding to an end of the fitting portion 11c) formed substantially perpendicular to a lower side surface of the arm 15a and has a surface on an upper edge member 13 side formed as a tilted surface toward the center of the upper edge member 13 with respect to the lower side surface of the arm 15a.

In this engaging portion 15c, the substantially perpendicular surface can be engaged with the lock portion 11d of the fitting portion 11c of the deflector member 11 and, with these engaged, the corner portions 11b of the deflector member 11 are inhibited from moving to a front portion 11a side. The tilted surface of the engaging portion 15c guides the lock portion 11d of the fitting portion 11c so that the lock portion easily engages with the substantially perpendicular surface of the engaging portion 15c. That is, with the lock portion 11d made along the tilted surface of the engaging portion 15c, the lock portion 11d can easily ride over the portion of the engaging portion 15c protruding downward to engage with the substantially perpendicular surface of the engaging portion 15c.

An upper portion of each corner portion 11b of the deflector member 11 substantially completely covers the arc-shaped portion 15a of the arm end 15. By the arc-shaped portion 15a, that corner arc shape is kept. With the lock portion 11d engaging with the engaging portion 15c, the outer end of the corner portion 11b of the deflector member 11 is reliably held at the outer end of the arm end 15. This can prevent shifts of the front portion 11a and the left and right corner portions 11b of the deflector member 11 to both of the inner side and the outer side in a lateral direction (vehicle-width direction) to keep a normal developing posture.

The connecting portion 15b of the arm end 15 is inserted in the end of the upper edge member 13 formed from a pipe material, and is provided with an engaging protrusion 42 which moves in and out by elastic deformation. At an end of the upper edge member 13 fitting in the connecting portion 15b, an engaging hole 43 which removably engages with the engagement protrusion 42 is formed.

The engaging protrusion 42 and the engaging hole 43 are to ensure connection between the connecting portion 15b and the upper edge member 13, configuring a detachment prevention mechanism 15d. The detachment prevention mechanism 15d also has a function to prevent rotation, restricting relative rotation of the connecting portion 15b and the upper edge member 13.

Also, a recessed portion 15e is formed at an end of the connecting portion 15b, and a protruded portion 13a engaging with the recessed portion 15e is formed on the inner peripheral surface of the upper edge member 13 formed from the pipe material. Engagement of the recessed portion 15e and the protruded portion 13a configures a rotation prevention means which restricts relative rotation of the connecting portion 15b and the upper edge member 13. Furthermore, a pressing portion 15f press-fitted onto the inner peripheral surface of the upper edge member 13 is formed to prevent rattles.

In the connection between the connecting portion 15b of the arm end 15 and the upper edge member 13 formed of the pipe material, only with the end of the upper edge member 13 connected to the connecting portion 15b, a flat surface is formed from the upper edge member 13 to the arc-shaped portion 15a, and no protruded step is present. Thus, wind noise hardly occurs. With detachment prevention and rotation prevention, rattles are also prevented. Also, the number of components can be reduced.

The arm body 16 is formed from a narrow spring steel (spring band plate). The base portion at the rear is attached to the side frame Fs to be tilted upward to the front, urging the arm end 15 connected to the front end to a direction of moving upward. The roof panel P at the fully-closed position or which moves to the fully-closed position pushes the fore part of the arm end 15 or the arm body 16 downward.

In FIG. 1, FIG. 5, and FIG. 6 to FIG. 9, the lower edge of the deflector member 11 has a notch 11e formed between the front portion 11a and the corner portion 11b (depicted in FIG. 7). The lower edge member 12 is formed as being divided into a front lower edge member 12a attached to the lower edge of the front portion 11a and an arc-shaped lower edge member 12b attached to the lower edge of the corner portion 11b. Provided laterally from the center to each side of the front frame Ff are a front attachment body 17 and an arc-shaped attachment body 18 to which the front lower edge member 12a and the arc-shaped lower edge member 12b are detachably attached, respectively.

The front attachment body 17 has a loose arc shape (or may have a linear shape) protruding from left and right toward the center, and has attached thereto the front lower edge member 12a as being inserted from above. This front attachment body 17 is integrally molded with the front frame Ff, but can be formed from a synthetic resin or the like and be attached to the front frame Ff via a fixture.

Figure 6A:
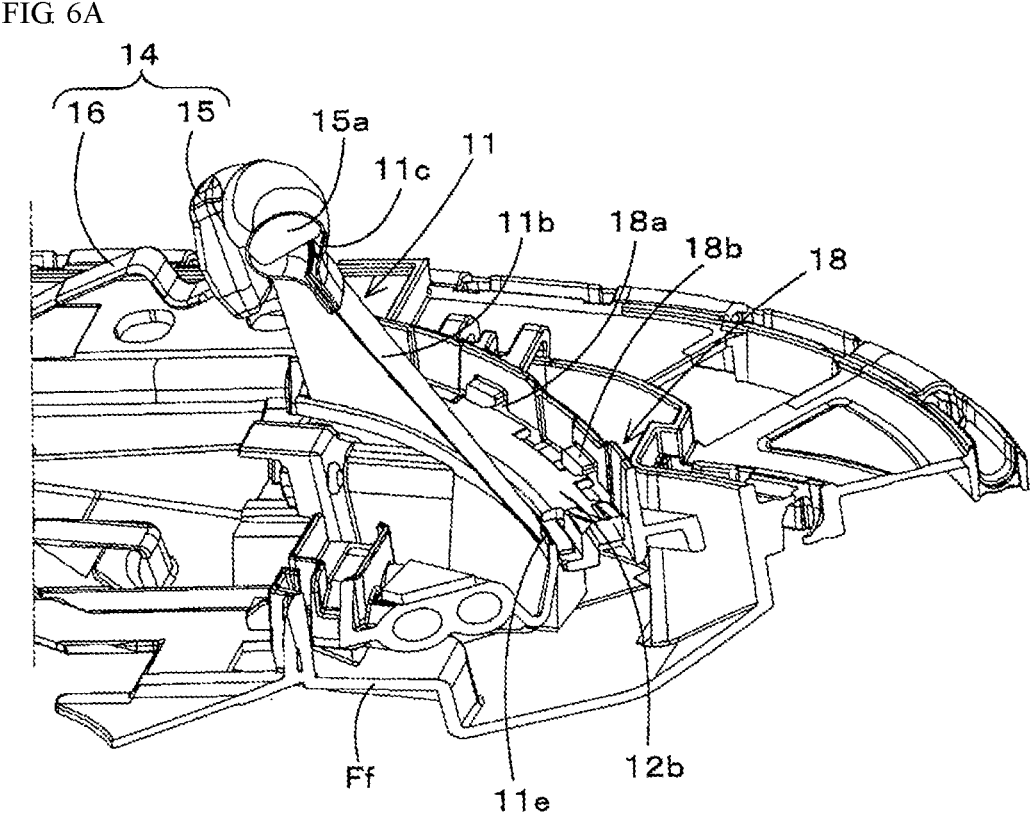
FIG. 6A depicts a cross section of the deflector mechanism and is a cross-sectional view of a corner portion of a deflector member.
Figure 6B:
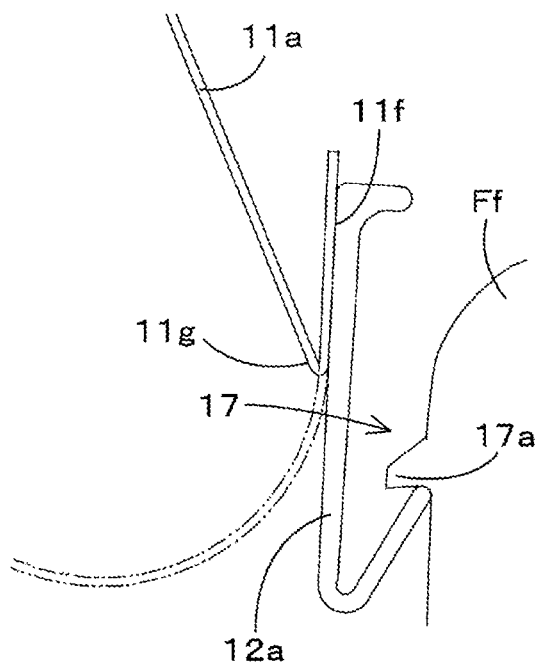
FIG. 6B depicts a cross section of the deflector mechanism and is a cross-sectional view of a lower portion of a front portion of the deflector member.

As depicted in FIG. 6(B), the front attachment body 17 has a hook hanging part 17a formed thereon. The front lower edge member 12a is formed in a hook shape (fabric support shape) which detachably engages with the hook hanging part 17a.

The front portion 11a of the deflector member 11 is provided to extend in a manner such that its lower end is in contact with an upper portion of the back surface of the front lower edge member 12a and is sewn, downward from its end, to the back surface of the front lower edge member 12a to a midway height and, when the posture of the deflector member 11 is changed from the collapsed posture to the wind deflection posture, the front portion 11a of the deflector member 11 extends upward from this midway height of the back surface.

With the lower portion of the front portion 11a oriented downward from the upper portion of the back surface of the front lower edge member 12a to the midway height, when the posture of the deflector member 11 is changed from the wind deflection posture to the collapsed posture and the deflector member 11 is stored, the upper portion of the front portion 11a moves down to be collapsed for storage so that the deflector member 11 is always drops downward from the lower end of the front portion 11a. Thus, it is possible to prevent the deflector member 11 from closing the opening K as protruding above the roof panel P.

Figure 5:
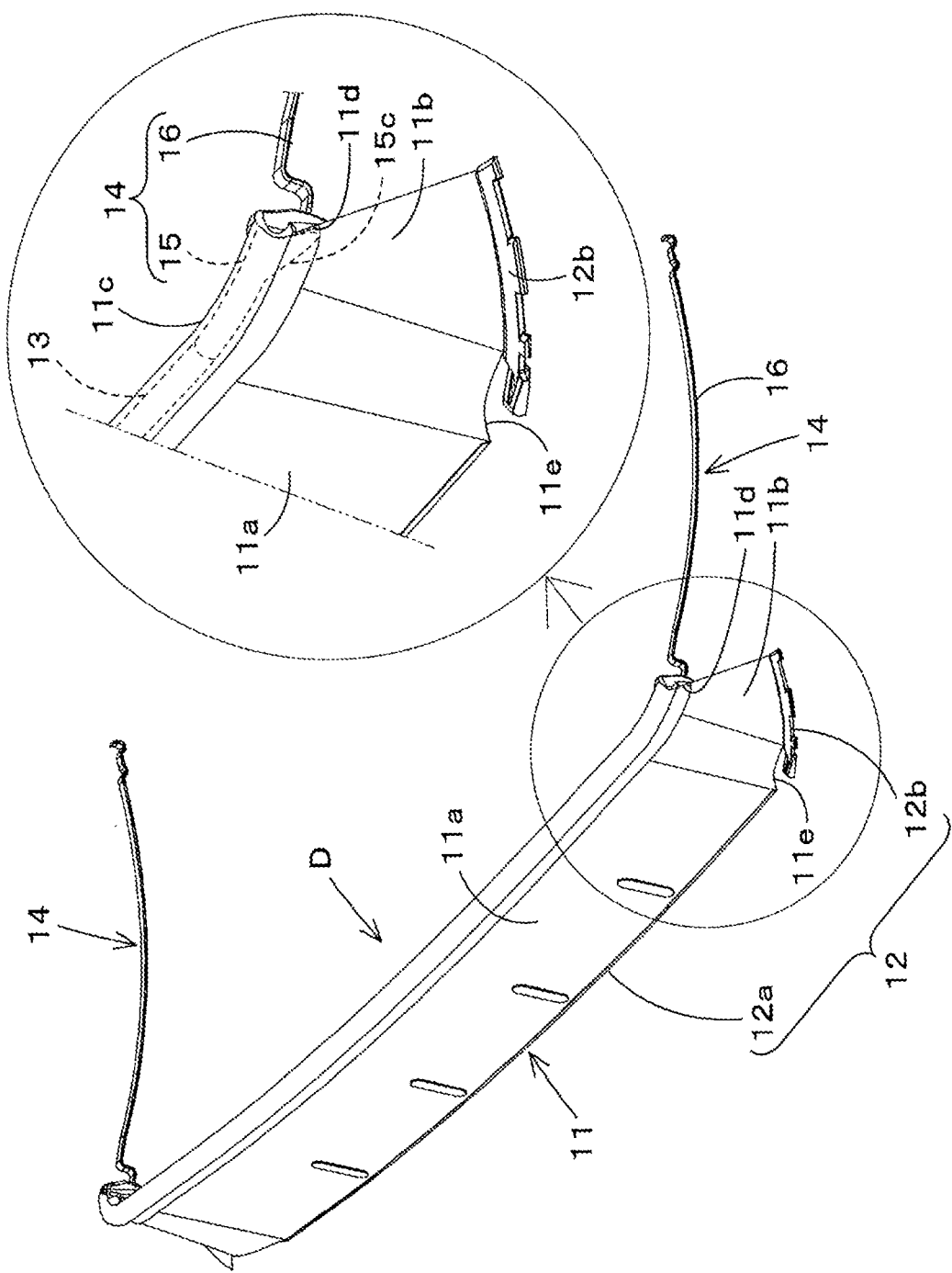
FIG. 5 is a perspective view depicting a deflector mechanism of the sunroof device.

The lower portion of the front portion 11a is sewn downward to the back surface of the front lower edge member 12 but, instead of being sewn, may be fused, welded, bonded by a double-sided tape, or the like, or may be directly attached to a vertical rib or the like provided on the upper surface of the front frame Ff. That is, it is only required for attachment that the front portion 11a has a bonded portion 11f bonded downward from an end to the lower edge member 12a and unbonded portion 11g adjacent to this bonded portion 11f and the unbonded portion 11g drops downward when the deflector member 11 is stored. An edge of this unbonded portion 11g is supported by the upper edge member 13. Furthermore, as depicted in FIG. 1 and FIG. 5, at least one plate formed from a synthetic resin or the like is provided on the surface of the front surface 11a of the deflector member 11, thereby making it easy for the upper portion of the front portion 11a to move down and drop downward from the lower end of the front portion 11a.

The arc-shaped attachment body 18 is formed from a synthetic resin or the like and attached to the front frame Ff. On its upper surface side, an arc-shaped groove portion 18a having a substantially arc-shaped groove in a planar view and a detachment inhibiting portion 18b bulging above the groove of this arc-shaped groove portion 18a. When the arc-shaped lower edge member 12b is inserted along the groove of the arc-shape groove portion 18a into that groove from a substantially horizontal direction, upward detachment is inhibited by the detachment inhibiting portion 18b. According to this structure, the arc-shaped lower edge member 12b can be formed so as to have a small thickness in a vehicle vertical direction. Note that the arc-shaped groove portion 18a may be formed on a side surface side of the arc-shaped attachment body 18. In that case, the arc-shaped lower edge member 12b can be formed so as to have a small thickness in a vehicle width direction. Furthermore, the arc-shaped attachment body 18 may not be provided as a separate body, and may be integrally formed with the front frame Ff or the side frames Fs.

The left and right corner portions 11b of the deflector member 11 are each provided with the arc-shaped lower edge member 12b at the lower edge. With this arc-shaped lower edge member 12b attached to the arc-shaped attachment body 18, the arc shape of the lower edge is ensured.

In the arc-shaped attachment body 18, a bridge portion 18c and an end attachment portion 18d are formed adjacently to the arc-shaped groove portion 18a. The bridge portion 18c has a cavity on a lower surface side at a position corresponding to the notch 11e of the lower edge of the deflector member 11, and thus can be disposed over the guide pipes 35, which are a structure on the frame structure F, and so forth, so as to avoid interference therewith. The bridge portion 18c may have a holding function of preventing floating of the structure.

The end attachment portion 18d is formed adjacently to the bridge portion 18c and is thus integral also to the arc-shaped groove portion 18a and, together with the front attachment body 17, has the end of the front lower edge member 12a removably attached thereto.

With the end of the front lower edge member 12a as well as the arc-shaped lower edge member 12b of the corner portion 11b attached to the arc-shaped attachment body 18, a positional relation between the front portion 11a of the deflector member 11 and the lower edge of the corner portion 11b is ensured.

In FIG. 1 to FIG. 4 and FIG. 10 to FIG. 14, the drip mechanism H is configured to receive rain water dripping from the rear edge of the roof panel P in the tilt-up posture and from the front edge of the closing panel N, receive rain water dripping from the rear edge of the roof panel P in the tilt-down posture, and receive rain water as moving together with the rear edge of the roof panel P until the roof panel P moves rearward to become in a fully-opened posture.

The drip mechanism H has a drip member 21 which covers over the entire length of a lower side of the rear edge of the roof panel P, a pair of left and right movable bodies 22 provided in the left and right side portions of the frame structure F, respectively, a lifting unit 23 connecting the drip member 21 to each of the left and right movable bodies 22 in a manner that allows the drip member 21 to move upward and downward, and an interlocking member 24 connecting the drip member 21 with the roof panel P.

The drip member 21 is configured so as to have a convex shape at the center in a lateral direction, with both left and right ends down to be positioned above drain rails Fb on the left and right side frames Fs; have an inverted-C-shaped cross section; and have an upper surface where a trough portion 21a with its upside open is formed so that rain water dripping from above is received by the trough portion 21a to be flown from the trough portion 21a to the drain rails Fb.

In the lifting unit 23, a pair of front and rear link members 25F and 25R connecting the drip member 21 with the movable body 22 and an urging member 26 urging, in a rising direction, portions of these paired link members 25F and 25R on the drip-member-21 connected side are provided.

The front and rear link members 25F and 25R of the lifting unit 23 are parallel to each other and set to have substantially the same link length L, and the front and rear link members 25F and 25R are tilted so that their upper portions are positioned at the rear of their lower portions.

In the front link member 25F of the lifting unit 23, a front engagement portion 25fb projects rearward-downward from a lower pivotally supporting portion 25fa, in the rear link member 25R of the lifting unit 23, a rear engagement portion 25rb projects forward-upward from a lower pivotally supporting portion 25ra, and a single urging member 26 is connected so as to apply a tensile force to the front engagement portion 25fb of the front link member 25F and the rear engagement portion 25rb of the rear link member 25R.

Each of the left and right movable bodies 22 includes a rear pivotally supporting portion 22r pivotally supporting the lower pivotally supporting portion 25ra of the rear link member 25R and a front pivotally supporting portion 22f disposed at higher position compared to this rear pivotally supporting portion 22r and pivotally supporting the lower pivotally supporting portion 25fa of the front link member 25F.

The paired left and right movable bodies 22 are movably disposed on the guiderails Fa of the of the left and right side frames Fs, respectively. Each movable body 22 has its upper surface side opened upward from the front pivotally supporting portion 22f to the rear pivotally supporting portion 22r so as to form a placement space 22a in which the lower pivotally supporting portions 25fa and 25ra of the front and rear link members 25F and 25R and the urging member 26 connected to both of the lower pivotally supporting portions 25fa and 25ra are disposed.

Also, stopper parts 27 are formed at the upper front and the lower front of the disposition space 22a of the movable body 22, and are configured so that the front engagement portion 25fb of the front link member 25F abuts on the stopper part 27 to restrict rising of the link member F and, when the front link member 25F falls down to the lowest position, the front engagement portion 25fb of the front link member 25F abuts on the stopper part 27 to inhibit a further falling motion. When falling down to the lowest position, the front and rear link members 25F and 25R become in a substantially horizontal posture.

Since the front link member 25F has the front engagement portion 25fb protruded downward from the lower pivotally supporting portion 25fa, the front pivotally supporting portion 22f is formed above the rear pivotally supporting portion 22r. To avoid interference with this front pivotally supporting portion 22f positioned above, notched recessed portions 21b are formed in fore parts on both left and right sides of the drip member 21. Since the notched recessed portions 21b can avoid interference with the front pivotally supporting portion 22f, the drip member 21 can move downward to a height substantially similar to that of the front pivotally supporting portion 22f, thereby reducing the vertical dimensions of the device.

The interlocking member 24 has formed at a fore part a front connecting pin part 24f rotatably connected to a rear part of the lift guide 39 and has formed at a rear part a rear connecting pin part 24r rotatably connected to the drip member 21. The rear connecting pin part 24r also serves as a connecting pin for connecting the upper portion of the front link member 25F and the drip member 21.

When the roof panel P is in the fully-closed posture, a first abutting surface 21c formed on the upper surface at each of left and right side ends of the drip member 21 and on a roof panel P side abuts on the roof panel P to be kept at a raised position. When the lifter 40 performs a tilt-up motion, a second abutting surface 21d formed on the upper surface at each of the left and right side ends of the drip member 21 and on a closing panel N side abuts on the closing panel N to be kept at a raised position.

When the lifter 40 performs a tilt-down motion, the interlocking member 24 rotates, and the roof panel P pushes the drip member 21 downward, thereby bringing the front and rear link members 25F and 25R down against the urging member 26 and moving the drip member 21 down to cause the roof panel P to become in a tilt-down state.

When the roof panel P performs tilt-up and tilt-down motions, the upper rear portions of the front and rear link members 25F and 25R swing as being centered around the lower pivotally supporting portions 25fa and 25ra of the lower front portions, respectively. Since the front and rear link members 25F and 25R are parallel links which are parallel and have a substantially equal link length L, the drip member 21 vertically performs translation operation as keeping the horizontal posture, and thus can receive rain water dripping from above in the trough portion 21a without leakage.

When the lifter 40 moves rearward, as the distance between the drip member 21 and the rear edge of the roof panel P is kept, the interlocking member 24 pushes and moves the drip member 21 and the front and rear link members 25F and 25R. Here, in the drip member 21, the notched recessed portion 21b of the fore part on each of the left and right sides is down at a position of fitting in (vertically overlapping) the front pivotally supporting portion 22f of the movable body 22, and thus the vertical dimensions of the rear portion of the sunroof device 1 can be shortened.

When the lifter 40 moves forward, the drip member 21 and the front and rear link members 25F and 25R are pulled forward via the interlocking member 24.

Note that the present invention is not limited by the embodiment and the shape, configuration, combination, and so forth of the members can be changed.

For example, as for mounting the sunroof device 1 on the vehicle, the sunroof device 1 may be attached from the upper surface of the roof R of the vehicle on the peripheral edge of the opening K. Also, as for the panels, the invention may be applied to the roof R of the vehicle without the closing panel N and with the opening K formed to be covered and uncovered by the roof panel P, a type in which the roof panel P does not tilt up and tilts down and then moves rearward, or a type in which the roof panel P does not move rearward and only tilts up. Also, the blind mechanism B may be omitted.

The front and rear link members 25F and 25R may be slightly unparallel, may have slightly different link lengths L, and may be tilted upward at the front. The urging member 26 which urges the front and rear link members 25F and 25R to a rising direction may be provided individually to the front and rear link members 25F and 25R.

The invention claimed is:

1. A drip mechanism of a sunroof device disposed in an upper portion of the frame structure disposed under an opening formed in a roof of a vehicle, the drip mechanism being disposed below a rear edge of a roof panel for covering and uncovering the opening, the drip mechanism being configured to move together with the roof panel when the roof panel moves, the drip mechanism comprising:
  a drip member including a trough portion in an upper surface thereof and covering the entire length of a lower side of the rear edge of the roof panel;
  a pair of left and right movable bodies disposed on guiderails provided in left and right side portions of the frame structure, respectively;
  a lifting unit connecting the drip member to each of the left and right movable bodies in a manner that allows the drip member to move upward and downward; and
  an interlocking member connecting the drip member with the roof panel,
  wherein in the lifting unit, a pair of front and rear link members connecting the drip member with the movable body and an urging member urging, in a rising direction, portions of the front and rear link members on the drip member-connected side are provided.

2. The drip mechanism of a sunroof device according to claim 1, wherein the front and rear link members of the lifting unit are parallel to each other and set to have substantially the same link length.

3. The drip mechanism of a sunroof device according to claim 1, wherein in the front link member of the lifting unit, a front engagement portion projects rearward-downward from a lower pivotally supporting portion, in the rear link member of the lifting unit, a rear engagement portion projects forward-upward from a lower pivotally supporting portion, and a single urging member is connected so as to apply a tensile force to the front engagement portion of the front link member and the rear engagement portion of the rear link member.

4. The drip mechanism of a sunroof device according to claim 1, wherein each of the left and right movable bodies includes a rear pivotally supporting portion pivotally supporting a lower pivotally supporting portion of the rear link member, and a front pivotally supporting portion disposed at a higher position compared to the rear pivotally supporting portion and pivotally supporting a lower pivotally supporting portion of the front link member, and
  the upper side of the movable body is opened upward from the front pivotally supporting portion to the rear pivotally supporting portion so as to form a placement space in which the lower pivotally supporting portions of the front and rear link members and the urging member connected to both of the lower pivotally supporting portions are disposed.

* * * * *